US010863505B2

(12) United States Patent
Akkarakaran et al.

(10) Patent No.: US 10,863,505 B2
(45) Date of Patent: Dec. 8, 2020

(54) DATA CHANNEL RESOURCE ALLOCATION

(71) Applicant: QUALCOMM Incorporated, San Diego, CA (US)

(72) Inventors: Sony Akkarakaran, Poway, CA (US); Tao Luo, San Diego, CA (US); Wenjun Li, Basking Ridge, NJ (US); Atul Maharshi, South Orange, NJ (US); Sundar Subramanian, Bridgewater, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 53 days.

(21) Appl. No.: 15/637,409

(22) Filed: Jun. 29, 2017

(65) Prior Publication Data
US 2018/0063843 A1 Mar. 1, 2018

Related U.S. Application Data

(60) Provisional application No. 62/380,252, filed on Aug. 26, 2016.

(51) Int. Cl.
*H04W 72/04* (2009.01)
*H04W 74/00* (2009.01)
(Continued)

(52) U.S. Cl.
CPC ....... *H04W 72/0453* (2013.01); *H04L 5/0037* (2013.01); *H04L 5/0044* (2013.01);
(Continued)

(58) Field of Classification Search
CPC ............... H04W 72/082; H04W 72/02; H04W 72/0406; H04W 72/042; H04W 52/146;
(Continued)

(56) References Cited

U.S. PATENT DOCUMENTS 8,855,072 B2 * 10/2014 Moon et al.
9,179,441 B2 11/2015 Xue et al.
(Continued)

FOREIGN PATENT DOCUMENTS

| EP | 2916605 A1 | 9/2015 |
| WO | WO-2013029419 A1 | 3/2013 |

OTHER PUBLICATIONS

International Search Report and Written Opinion—PCT/US2017/040410—ISA/EPO—dated Sep. 21, 2017.

*Primary Examiner* — Marsha D Banks Harold
*Assistant Examiner* — Dharmesh J Patel
(74) *Attorney, Agent, or Firm* — Haynes and Boone, LLP

(57) ABSTRACT

Wireless communications systems and methods related to allocating resource blocks and resource block groups in a system band in order to reduce overhead associated with resource allocation. To reduce overhead, the wireless communication device communicates a signal in a control channel that indicates a general area and a resource block in the general area that stores data. The wireless communication device then communicates multiple resource blocks that include the resource block and communicates the data in the resource block using the signal. To reduce overhead, the wireless communication device also communicates multiple mappings for each resource block group into a set of resource blocks and a signal in a control channel that selects one of the multiple mappings. The communication device then determines resource blocks that are included in the resource block group according to the mapping, and communicates data in these resource blocks.

23 Claims, 7 Drawing Sheets

(51) Int. Cl.
  *H04L 5/00* (2006.01)
  *H04W 72/12* (2009.01)
  *H04W 16/10* (2009.01)
  *H04W 72/08* (2009.01)

(52) U.S. Cl.
  CPC ............ *H04L 5/0094* (2013.01); *H04W 16/10* (2013.01); *H04W 72/04* (2013.01); *H04W 72/0446* (2013.01); *H04W 72/085* (2013.01); *H04W 72/12* (2013.01); *H04W 72/1231* (2013.01); *H04W 74/002* (2013.01)

(58) Field of Classification Search
  CPC ..... H04W 52/34; H04W 52/54; H04W 52/58; H04W 84/047; H04W 92/20; H04W 16/10; H04W 24/02; H04W 72/04; H04W 72/0446; H04W 72/0453; H04W 72/085; H04W 72/12; H04W 72/1231; H04W 72/14; H04W 74/002; H04J 11/005; H04J 11/0023; H04L 5/0035; H04L 5/0048; H04L 5/0007; H04L 5/0073; H04L 5/001; H04L 5/0037; H04L 5/0044; H04L 5/0053; H04L 5/0094; H04B 7/15; H04B 7/15542; H04B 1/0475; H04B 1/10; Y02D 30/30

See application file for complete search history.

(56) References Cited

U.S. PATENT DOCUMENTS

| | | |
|---|---|---|
| 2009/0325585 A1* | 12/2009 | Farajidana et al. |
| 2010/0284348 A1 | 11/2010 | Kashima et al. |
| 2011/0164550 A1* | 7/2011 | Chen et al. |
| 2013/0017835 A1 | 1/2013 | Takahashi et al. |
| 2013/0114512 A1* | 5/2013 | Yamamoto |
| 2013/0250882 A1* | 9/2013 | Dinan |
| 2014/0044085 A1 | 2/2014 | Hong |
| 2016/0100382 A1 | 4/2016 | He et al. |

\* cited by examiner

DATA CHANNEL RESOURCE ALLOCATION

CROSS REFERENCE TO RELATED APPLICATIONS

The present application claims priority to and the benefit of the U.S. Provisional Patent Application No. 62/380,252, filed Aug. 26, 2016, which is hereby incorporated by reference in its entirety.

TECHNICAL FIELD

The embodiments described herein relate to resource allocation, and more specifically to allocating resource blocks and resource block groups in a frequency band in order to reduce overhead.

INTRODUCTION

In conventional systems, user equipment (UE) is scheduled with a set of contiguously allocated localized resource blocks (RBs). Conventionally, the RBs are allocated in the sub-frame. RBs are also allocated into resource block groups (RBG) in contiguous chunks of fixed size. When RBs are allocated into RBGs, each RBG consists of a resource allocation field which includes a resource indication value that corresponds to a starting RB size and a length in terms of the contiguously allocated RBs.

BRIEF SUMMARY OF SOME EXAMPLES

The following summarizes some aspects of the disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

For example, in an aspect of a disclosure, a method for wireless communications includes communicating, by a wireless communication device, a signal in a control channel that indicates a general area and a resource block in the general area that stores data, communicating a plurality of resource blocks that include the resource block, and communicating data from the resource block using the signal.

In an additional aspect of a disclosure, an apparatus includes a transceiver of a wireless communication device configured to communicate a signal in a control channel that indicates a general area and a resource block in the general area that stores data, communicate a plurality of resource blocks that include the resource block, and communicate data from the resource block using the signal.

In an additional aspect of a disclosure, an apparatus includes a transceiver of a wireless communication device configured to communicate a plurality of mappings for each resource block group into a set of resource blocks in a shared channel, communicate, by the wireless communication device, a signal in a control channel that selects a mapping from the plurality of mappings, and communicating data in resource blocks. The apparatus also includes a processor configured to determine the resource blocks in the shared channel that are included in the resource block group according to the mapping.

Other aspects, features, and embodiments of the disclosure will become apparent to those of ordinary skill in the art, upon reviewing the following description of specific, exemplary embodiments of the disclosure in conjunction with the accompanying figures. While features of the disclosure may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

The techniques described herein may be used for various wireless communication networks such as code-division multiple access (CDMA), time-division multiple access (TDMA), frequency-division multiple access (FDMA), orthogonal frequency-division multiple access (OFDMA), single-carrier FDMA (SC-FDMA) and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). 3GPP Long Term Evolution (LTE) and LTE-Advanced (LTE-A) are new (e.g., 4G networks) releases of UMTS that use E-UTRA. UTRA, E-UTRA, UMTS, LTE, LTE-A and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the wireless networks and radio technologies mentioned above as well as other wireless networks and radio technologies, such as a next generation (e.g., $5^{th}$ Generation (5G)) network.

Figure 1:
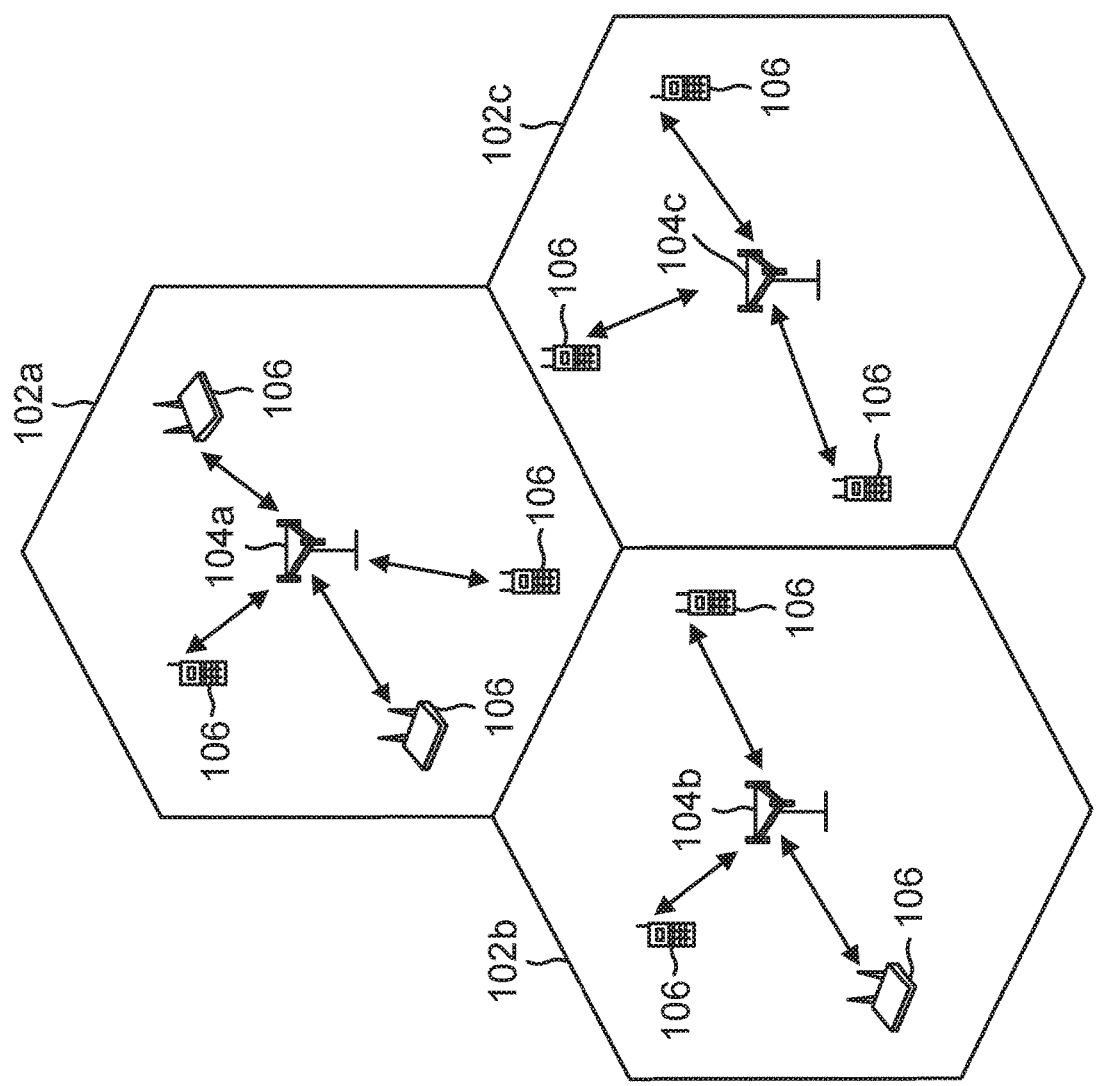
FIG. 1 is a diagram of an exemplary wireless communications environment according to an embodiment.

FIG. 1 illustrates a wireless communication network 100 in accordance with various aspects of the disclosure. The wireless network 100 may include a number of base stations 104 and a number of user equipment (UE) 106, all within one or more cells 102 as illustrated in FIG. 1. For example, FIG. 1 shows base stations 104a, 104b, and 104c associated with cells 102a, 102b, and 102c, respectively. The communications environment 100 may support operation on multiple carriers (e.g., waveform signals of different frequencies). Multi-carrier transmitters can transmit modulated signals simultaneously on the multiple carriers. For example, each modulated signal may be a multi-carrier channel modulated according to the various radio technologies described above. Each modulated signal may be sent on a different carrier and may carry control information (e.g., pilot signals, control channels, etc.), overhead information, data, etc. The communications environment 100 may be a multi-carrier LTE network capable of efficiently allocating network resources. The communications environment 100 is one example of a network to which various aspects of the disclosure apply.

A base station (BS) 104 as discussed herein can have various characteristics. In some scenarios, it may include an evolved Node B (eNodeB or eNB) in the LTE context, for example. A base station 104 may also be referred to as a base transceiver station or an access point. It will be recognized that there could be one to many base stations, as well as be an assortment of different types such as macro, pico, and/or femto base stations. The base stations 104 may communicate with each other and other network elements via one or more backhaul links. The base stations 104 communicate with the UEs 106 as shown, including via direct wireless connections or indirect, e.g., via relay devices. A UE 106 may communicate with a base station 104 via an uplink and a downlink. The downlink (or forward link) refers to the communication link from a base station 104 to a UE 106. The uplink (or reverse link) refers to the communication link from a UE 106 to a base station 104.

The UEs 106 may be dispersed throughout the wireless network 100, and each UE 106 may be stationary or mobile. A UE may also be referred to as a terminal, a mobile station, a subscriber unit, etc. A UE 106 may be a cellular phone, a smartphone, a personal digital assistant, a wireless modem, a laptop computer, a tablet computer, entertainment device, medical device/equipment, biometric devices/equipment, fitness/exercise devices, vehicular components/sensors, etc. The wireless communication network 100 is one example of a network to which various aspects of the disclosure apply.

Figure 2:
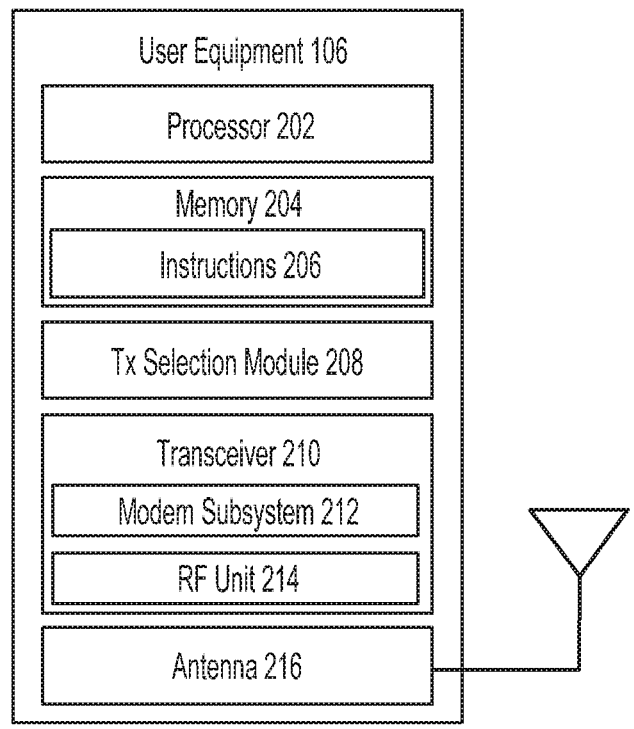
FIG. 2 is a block diagram of exemplary user equipment (UE) according to an embodiment.

FIG. 2 is a block diagram of UE 106 according to embodiments of the present disclosure. The UE 106 may include a processor 202, a memory 204, a transmission access resource selection module 208, a transceiver 210, and an antenna 216. These elements may be in direct or indirect communication with each other, for example via one or more buses.

The processor 202 may include a central processing unit (CPU), a digital signal processor (DSP), an application-specific integrated circuit (ASIC), a controller, a field programmable gate array (FPGA) device, another hardware device, a firmware device, or any combination thereof configured to perform the operations described herein. The processor 202 may also be implemented as a combination of computing devices, e.g., a combination of a DSP and a microprocessor, a plurality of microprocessors, one or more microprocessors in conjunction with a DSP core, or any other such configuration.

The memory 204 may include a cache memory (e.g., a cache memory of the processor 442), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an embodiment, the memory 204 includes a non-transitory computer-readable medium. The memory 204 may store instructions 206. The instructions 206 may include instructions that, when executed by the processor 202, cause the processor 202 to perform the operations described herein with reference to the UE 106 in connection with embodiments of the present disclosure. Instructions 206 may also be referred to as code. The terms "instructions" and "code" may include any type of computer-readable statement(s). For example, the terms "instructions" and "code" may refer to one or more programs, routines, subroutines, functions, procedures, etc. "Instructions" and "code" may include a single computer-readable statement or many computer-readable statements. The transmission access resource selection module 208 may be configured to select and assign resources (e.g., time resources and/or frequency resources) for transmission of uplink bursts from UE 106, discussed in more detail below.

The transceiver 210 may include a modem subsystem 212 and a radio frequency (RF) unit 214. The transceiver 210 is configured to communicate bi-directionally with other devices, such as base stations 104. The modem subsystem 212 may be configured to modulate and/or encode the data from the memory 204 and/or the transmission access resource selection module 208 (and/or from another source, such as some type of sensor) according to a modulation and coding scheme (MCS), e.g., a low-density parity check (LDPC) coding scheme, a turbo coding scheme, a convolutional coding scheme, etc. The RF unit 214 may be configured to process (e.g., perform analog to digital conversion or digital to analog conversion, etc.) modulated/encoded data from the modem subsystem 212 (on outbound transmissions) or of transmissions originating from another source such as a base station 104. Although shown as integrated together in transceiver 210, the modem subsystem 212 and the RF unit 214 may be separate devices that are coupled together at the UE 106 to enable the UE 106 to communicate with other devices.

The RF unit 214 may provide the modulated and/or processed data, e.g. data packets (or, more generally, data messages which may contain one or more data packets and other information), to the antenna 216 for transmission to one or more other devices. This may include, for example, transmission of data to a base station 104 according to embodiments of the present disclosure. The antenna 216 may further receive data messages transmitted from a base station 104 and provide the received data messages for processing and/or demodulation at the transceiver 210. Although FIG. 2 illustrates antenna 216 as a single antenna, antenna 216 may include multiple antennas of similar or different designs in order to sustain multiple transmission links.

Figure 3:
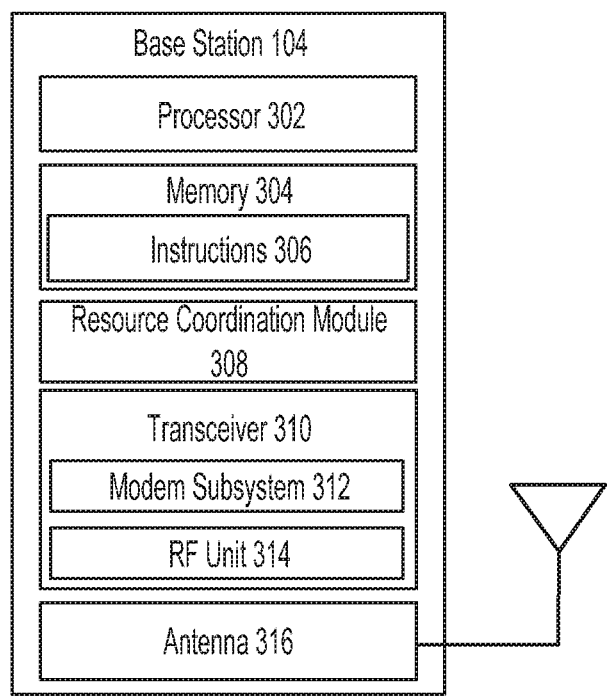
FIG. 3 is a block diagram of an exemplary base station according to an embodiment.

FIG. 3 is a block diagram of an exemplary base station 104 according to embodiments of the disclosure. The base station 104 may include a processor 302, a memory 304, a resource coordination module 308, a transceiver 310, and an antenna 316. These elements may be in direct or indirect communication with each other, for example via one or more buses. The base station 104 may be an evolved Node B (eNodeB or eNB), a macro cell, a pico cell, a femto cell, a relay station, an access point, or another electronic device operable to perform the operations described herein with respect to the base station 104. The base station 104 may operate in accordance with one or more communication standards, such as a 3rd generation (3G) wireless communication standard, a 4th generation (4G) wireless communication standard, a long term evolution (LTE) wireless communication standard, an LTE-advanced wireless communication standard, or another wireless communication standard now known or later developed (e.g., a next generation network operating according to a 5G protocol).

The processor 302 may include a CPU, a DSP, an ASIC, a controller, a FPGA device, another hardware device, a firmware device, or any combination thereof configured to perform the operations described herein with reference to the base station 104 introduced in FIG. 1 above. The processor 302 may also be implemented as a combination of computing devices, e.g., a combination of a DSP and a microprocessor, a plurality of microprocessors, one or more microprocessors in conjunction with a DSP core, or any other such configuration.

The memory 304 may include a cache memory (e.g., a cache memory of the processor 302), RAM, MRAM, ROM, PROM, EPROM, EEPROM, flash memory, a solid state memory device, one or more hard disk drives, other forms of volatile and non-volatile memory, or a combination of different types of memory. In an embodiment, the memory 304 includes a non-transitory computer-readable medium. The memory 304 may store instructions 306. The instructions 306 may include instructions that, when executed by the processor 302, cause the processor 302 to perform the operations described herein with reference to the base station 104 in connection with embodiments of the present disclosure. Instructions 306 may also be referred to as code, which may be interpreted broadly to include any type of computer-readable statement(s) as discussed above with respect to FIG. 2. The resource coordination module 308 may be configured to coordinate resource usage (e.g., time resources and/or frequency resources) among the base stations 104 when communicating with the UEs 106, such as to mitigate or at least reduce interference among the base stations 104.

The transceiver 310 may include a modem subsystem 312 and a radio frequency (RF) unit 314. The transceiver 310 is configured to communicate bi-directionally with other devices, such as UEs 106. The modem subsystem 312 may be configured to modulate and/or encode data according to a MCS, some examples of which have been listed above with respect to FIG. 2. The RF unit 314 may be configured to process (e.g., perform analog to digital conversion or digital to analog conversion, etc.) of modulated/encoded data from the modem subsystem 312 (on outbound transmissions) or of transmissions originating from another source, such as an UE 106. Although shown as integrated together in transceiver 310, the modem subsystem 312 and the RF unit 314 may be separate devices that are coupled together at the base station 104 to enable the base station 104 to communicate with other devices.

The RF unit 314 may provide the modulated and/or processed data, e.g. data packets, to the antenna 316 for transmission to one or more other devices such as UEs 106. The modem subsystem 312 may modulate and/or encode the data in preparation for transmission. The RF unit 314 may receive the modulated and/or encoded data packet and process the data packet prior to passing it on to the antenna 316. This may include, for example, transmission of data messages to UEs 106 or to another base station 104, according to embodiments of the present disclosure. The antenna 316 may further receive data messages transmitted from UEs 106, and provide the received data messages for processing and/or demodulation at the transceiver 310. Although FIG. 3 illustrates antenna 316 as a single antenna, antenna 316 may include multiple antennas of similar or different designs in order to sustain multiple transmission links.

Figure 4:
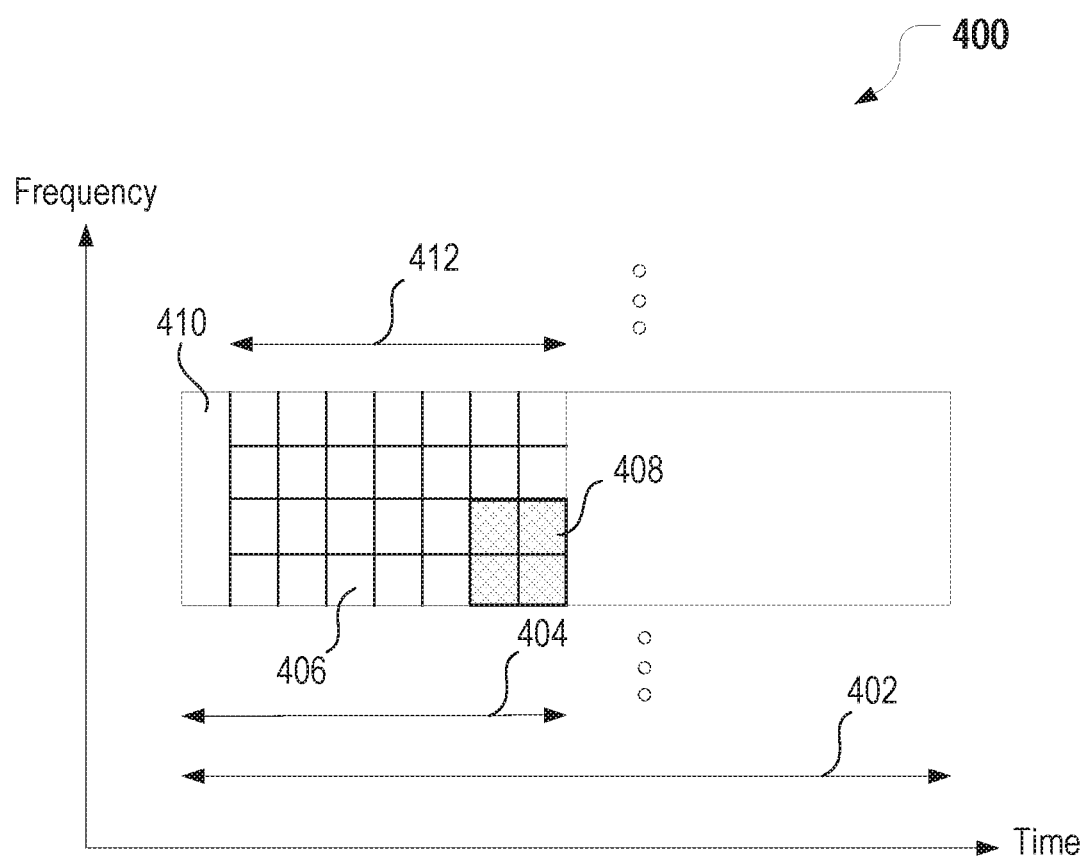
FIG. 4 is a block diagram of carriers in a system band divided into sub-frames which include resources for carrying data, according to an embodiment.

As described above, carriers carry data in the communications environment 100. FIG. 4 is a block diagram 400 of the carriers divided into sub-frames which include resources for carrying data, according to an embodiment. To carry data, carriers may be divided into frames 402 of predefined time length. The frames may further be divided into sub-frames 404. The sub-frames 404 may also be subdivided into resource blocks or RBs 406. Each RB 406 is the smallest unit of resources that can be allocated to a user, such as a UE 104.

In a further embodiment, one or more RBs 406 may be organized into a resource block group (RBG) 408. Conventionally, the size of each RBG 408 in a carrier is static. However, depending on the bandwidth of the carrier, the size of each RBG 408 may vary. For example, in some instances the RBG 408 may include up to four or more RBs 406. For example, bandwidths occupying a smaller number of MHz may have a smaller number of RBs 406 in RBG 408, while bandwidths occupying a larger number of MHz may have a larger number of RBs 406 in RBG 408.

Each sub-frame 404 may also be subdivided into a control channel 410 and a shared channel 412. Example control channel 410 may include a Physical Downlink Control Channel (PDCCH) that transmits control signals from base station 104 to UE 106 and a Physical Uplink Control Channel (PUCCH) that transmits control signals from UE 106 to base station 104. Although not shown in FIG. 4, control channel 410 may also be subdivided into RBs 406. Example shared channel 412 may include a Physical Uplink Shared Channel (PUSCH) and Physical Downlink Shared Channel (PDSCH).

In an embodiment, control channel 410 carries control information, while shared channel 412 carries data included in RBs 406. For example, control information may include a bitmap that identifies RBs 406 and/or RBGs 408 that have been allocated to one or more UEs 106. The embodiments described below in FIGS. 5-8 incorporate various techniques that may be used to assign RBs 406 to RBGs 408 in order to allocate resources to UE 106 and which conserve resources and reduce overhead in the carrier.

Figure 5:
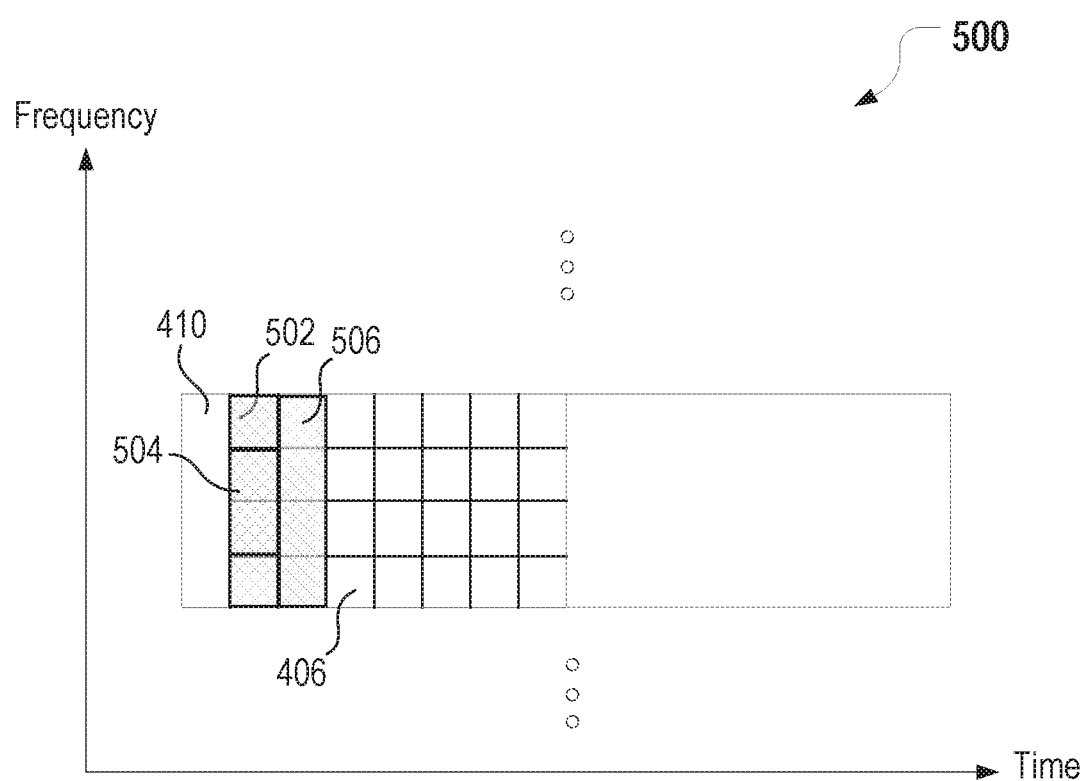
FIG. 5 is a block diagram of resource blocks being assigned to a carrier using a contiguous scheme, according to an embodiment.

FIG. 5 is a block diagram 500 of resource blocks being assigned to a carrier using a contiguous scheme, according to an embodiment. Some transmission schemes, such as a single-carrier frequency-division multiplexing (SC-FDM) transmission scheme, requires RBs 406 to be assigned using a contiguous scheme. A contiguous scheme is a scheme where RBs 406 allocated to the same UE 106 are contiguously placed in the frequency domain. In an embodiment, such scheme may be implemented on an up-link when data is being transmitted from UE 106 to base station 104.

One way to assign resource blocks in a contiguous scheme is to indicate a starting RB 406 and a number of RBs 406 needed to transmit data. For example, by knowing the starting RB and the number of RBs 406 allocated for the transmission, the UE 106 knows where to begin to load data prior to transmitting the data to the base station 104. In an embodiment, the index of the starting RB 406 and a number of RBs 406 may be transmitted via the control channel 410. In an embodiment, an OFDMA transmission scheme may also use contiguous allocation.

In another embodiment, rather than indicating a starting RB 406 and a number of RBs 406, the RBs 406 may be assigned as sets of RBs 406. Each set, for example, may be a power of two or another power. In this case, set 502 may include one RB 406, set 504 may include two RBs 406, and set 506 may include four RBs 406, as illustrated in FIG. 5. In an embodiment, when RBs 406 are assigned using sets that are a power to two, the starting RB 406 and a power may be transmitted via the control channel 410. Sets or RBGs where the number of RBs 406 are constrained by a power of two (or another power) may be implemented in millimeter-wave transmission technologies. Restricting a number of RBs 406 in a set or RBG to a power of two (or another power), can also simplify a Discrete Fourier Transform (DFT) operation required for the SC-FDM transmission because the algorithm may perform faster when the number of RB's 406 are set to a power of two rather than an arbitrary number of RBs 406.

Figure 6:
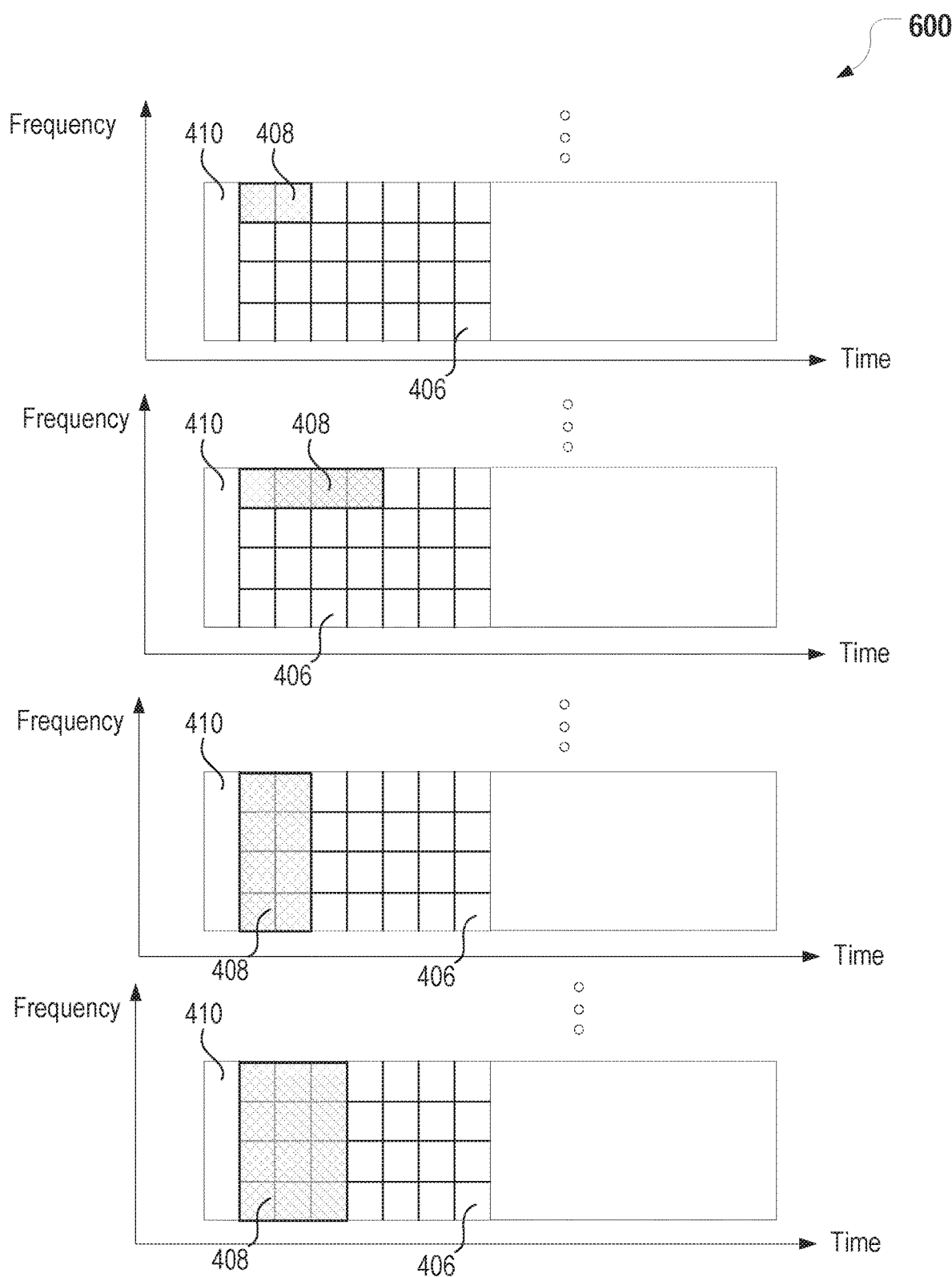
FIG. 6 is a block diagram of resource blocks being assigned to resource block groups having a dynamic size, according to an embodiment.

FIG. 6 is a block diagram 600 of resource blocks being assigned to RBGs having a dynamic size. In a non-contiguous resource allocation scheme, it can be advantageous to enable assignment flexibility and exploit frequency channel diversity. A bitmap provides a way to enable assignment flexibility and exploit channel diversity. For example, a bitmap may be used to indicate resource assignment.

In an embodiment, resources such as RBs 406 are assigned to UEs 106 when UEs 106 receive or transmit data from the base station 104. For example, base station 104 may assign different RBs 406 within sub-frame 404 to different UEs 106. In this case, the base station 104 needs to track which RBs 406 are assigned to which UEs 106 and also needs to communicate the assignment to the UEs 106 over the control channel 410, which creates overhead. For example, in a 60 kHz subcarrier spacing, there are 1200 usable subcarriers (100 RBs 406) in a 80 MHz band, and 1488 usable subcarriers (124 RBs 406) in a 100 MHz band, if one RB includes 12 subcarriers. This can result in the bitmap that includes RB allocation lead to having an overhead of 100 bits and 124 bits, respectively.

One way to reduce the overhead is for the base station 104 to assign RBs 406 into RBGs 408 of a fixed size, as illustrated in FIG. 4. When RBGs 408 are static and with a size of four RBs 406 per RBG 408, the overhead for transmitting the RBGs 408 allocation in the 80 MHz band is reduced 25 bits, and in 100 MHz band is reduced to 31 bits. The control channel 410 can include a bitmap or another control signal that is at least 25 bits in the 80 MHz band and at least 31 bits in the 100 MHz band, where the value of each bit (e.g., 0 or 1) indicates to UE 106 whether RBG 408 that corresponds to the bit is allocated for that UE 106 or not.

The number of RBs 406 within an RBG 408 may be dynamically configured. Because the number of RBs 406 may be dynamically configured for each RBG 408, each RBG 408 may dynamically vary in size. As illustrated in FIG. 6 in a non-limiting embodiment, the size of RBGs 408 may be two, four, eight, or twelve RBs 406 per RBG 408. In this case, when RBG size is four in a system bandwidth of 80 MHz, the overhead for a bitmap is 25 bits. In another example, when RBG size is eight in a system bandwidth that is 100 MHz, the overhead for a bitmap is 16 bits. In these cases, the size of the bitmap does not exceed 25 bits.

In one example, base station 104 may configure the size of RBG 408 and communicate the size of RBG 408 to UE 106 via control channel 410. Such configuration may occur when base station 104 initiates communication with UE 106 or during communication between the base station 104 and UE 106. The UE 106 may receive a control signal from base station 104 via control channel 410 that indicates the size of the RBG 408 and based on the control signal may allocate RBs 406 to RBG 408.

In an embodiment, UE 106 may be configured with a set of RBG sizes. These sets may either be stored in memory 204 of the UE 106 or are hardwired into the hardware of the UE 106. In this case, UE 106 may receive a control signal via control channel 110 that indicates the size of RBG 408 or indicates a position in the set of RBG sizes that corresponds to the size of the RBG. The UE 106 may then allocate the size of the RBG 408 based on the control signal.

In a further embodiment, UE 106 may determine RBG 408 size from the numerology used in the transmission. For example, the size of RBG 408 may vary based on the tone spacing in the frequency band. For example, the size of RBG 408 may vary when the tone spacing is 60 kHz compared to when the tone spacing is 120 kHz.

Figure 7:
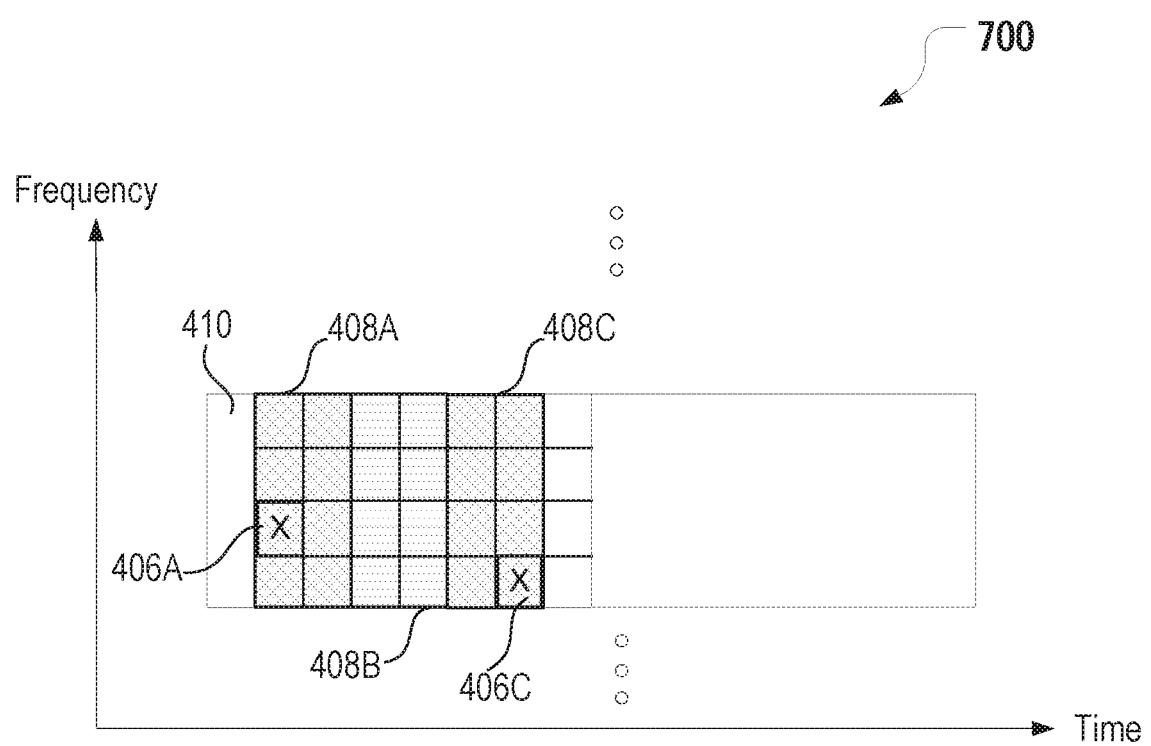
FIG. 7 is a block diagram of a multi-level indication for resource block allocation, according to an embodiment.

FIG. 7 is a block diagram 700 of a multi-level indication for resource block allocation, according to an embodiment. When UEs 106 and base stations 104 transmit data for different applications, each application may require different allocation of RBs 406 or RBGs 408. Further resource allocation may not be limited to multiples of the size of the RBGs 408. For example, a voice application may require a single RB 406. However, even when only one RB 406 is allocated, the bitmap that indicates the location of the RB 406 in the band still remains the same, and constitutes a large overhead. For instance, for a 100 MHz bandwidth that includes 124 RBs 406, the bitmap may be 124 bits. This means that the control channel 410 transmits a control signal that includes at least 124 bits. When only a single RB 406 is allocated, the bitmap may have a single bit out of 124 bits turned on, while the rest of the bits in the bitmap are turned off.

In an embodiment, multi-level indication of the allocated resources, such as RBs 406 and/or RBGs 408 may reduce the amount of overhead required to transmit a bitmap with only a fraction of the bits turned on. As illustrated in FIG. 7, a sub-frame includes three RBGs 408A, 408B, and 408C, with only two RBs, RB 406A and RB 406C being allocated in RBG 408A and 408C, respectively.

In an embodiment illustrated in FIG. 7, a two-level bitmap or another two-level indication may be used to reduce the bitmap overhead when a few RBs 406 are allocated for an application. The two-level indication includes two parts and may be used for fine-granularity resource allocation, according to an embodiment. The first part of the two-level indication indicates the location of general area where one or more RBs 406 are located. Example general area may be the RBG 408 that includes RB 406. In an embodiment, the general area may refer to one or more sub-bands of a carrier. In another embodiment, the general area may correspond to the RBG index or indexes that correspond to the allocation. With reference to FIG. 7, the general area may be the index of RBG 408A and 408C.

In an embodiment, the second part of the two-level indication indicates the location of the RB 406 within the general area. For example, the second part of the two-level indication indicates the location of one or more RB 406 within RBG 408. The location may be indicated by the RB index or indexes within RBG 408. With reference to FIG. 7, the location of the RB 406 may be the index or indices of RB 406A and 406C that correspond to the location of RB 406A and 406C. Thus, with reference to FIG. 7, instead of a bitmap that includes a bit for each RB 406 in the band, the control signal transmitted in the control channel 410 may include indices or a bitmap of indices for RBGs 408 and RBs 406 which indicate that RBG 408A, RB 406C and RBG 408C, RB 406C have been allocated.

In an embodiment, when using the two-level indication with 128 RBs in the frequency band of the carrier or component of the carrier with the RBG 408 size equal to eight, the two-level indication is equal to the 24 bits, where 16 bits indicate one of RBGs 408 and the 8 bits indicate the position of the RB 406 within RBG 408 if the bitmap-based indication is used at both levels. In another example, when using the two-level indication with 128 RBs in the frequency band of the carrier or component of the carrier with the RBG 408 size equal to eight, the single-index based indication is equal to 7 bits, with 4 bits indicating the RBG 408 and 3 bits indicating the RB 406 within RBG 408. In an embodiment, the single-index based indication can be used for localized resource indication. In another embodiment, a combination of a single-indexed based and bitmap based indication may also be used with the two-level indication.

Figure 8:
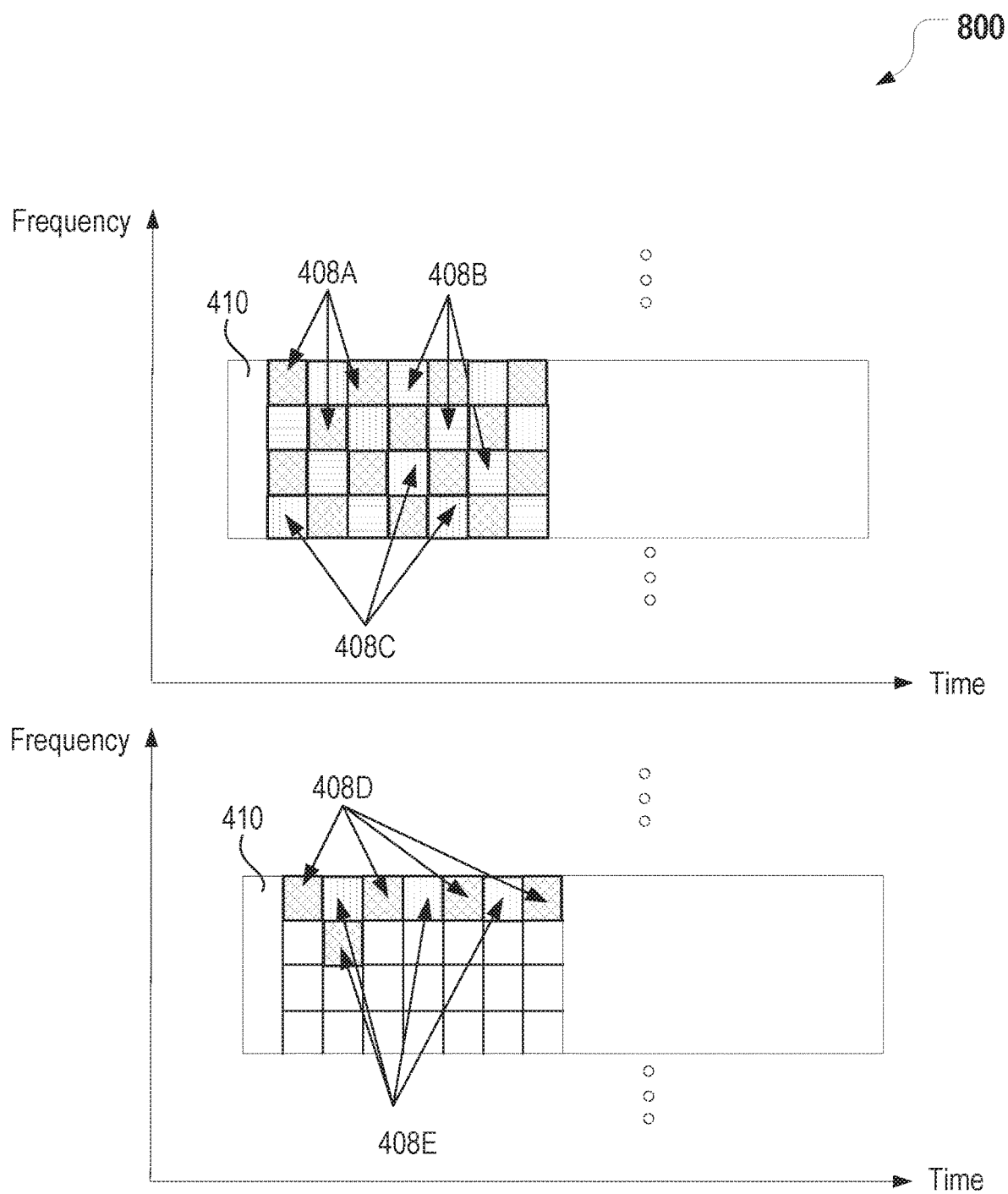
FIG. 8 is a block diagram of non-contiguous group resource blocks, according to an embodiment.

FIG. 8 is a block diagram 800 of non-contiguous group resource blocks, according to an embodiment. In an embodiment, when allocating resources by assigning one or more RBGs 408 rather than RBs 406, the allocation reduces overhead. For instance, the bitmap transmitted in the control channel 410 may need to include the allocation for RBGs 408 rather than for individual RBs 408, and as a result may require fewer bits. However, because RBGs 408 include one or more contiguous RBs 406, allocating resources using RBGs 408 also reduces assignment flexibility.

In an embodiment, RBGs 408 may also be implemented as a non-contiguous block of RBs 406. In one example, RBG 408 may be defined as a set of RBs 406 that are equi-spaced in the frequency band. For example, RBG 408A may include every second RB 406 in the frequency band, while RBG 408B may include every fourth RBG 406 in the frequency band. In a further embodiment, different RBGs 408 may be defined so that multiple RBGs 408 cover the entire frequency band, as shown with RBGs 408A, 408B and 408C. This way, one RBG, such as RBG 408A can be allocated to one UE 106, while another RBG, such as RBG 408B can be allocated to another UE 106. Further, with equi-spacing the RBs 406 may no longer be contiguous within the RBG 408 but can be spread out throughout the frame in both frequency and time.

Further, the spacing itself may be configurable and could be selected via a control signal transmitted in the control channel 410. In an embodiment, the control signal may indicate the starting RB 406 in the RBG 408 and the spacing between the RBs 406 in the same RBG 408. By knowing the starting RB 406 and the spacing between the RBs 406, UE 106 may determine the RBs 406 in the RBG 408 that was allocated to the UE 106.

In another example, the mapping of RBs 406 to different RBGs 408 may be coded into a table or another data structure. When the mapping is coded into the table, the spacing between RBs 406 and RBGs 408 may be arbitrary and not contiguous. For example, RBG 408C may include RBs 406C in the first, third, fifth, and seventh position in the frequency band, while RBG 408D may include RBs 406 that are in the second, fourth, sixth, and ninth position in the frequency band. In a further embodiment, there may be multiple tables that define different RBG 408 configurations. In a further embodiment, the tables which store different RBG 408 configurations may be stored or hardwired within the UE 106.

In an embodiment, the UE 106 may receive a control signal in the control channel 410 (such as PDCCH or PUCCH) that may be used to control the size of the RBG 408 used in sub-frame 404 or multiple sub-frames 404 for the shared channel 412 (such as PDSCH, PUSCH, or both). In yet another embodiment, the control signal may select one of the tables that store the mapping of RBs 408 in RBGs 408. Based on the RBG configuration included in the table and selected by the control signal, the UE 106 may allocate RBs 406 from sub-frame 404 to the RBG 408 in a non-contiguous manner.

In an embodiment, the mapping in the table may be a function of the RBG index. In yet another embodiment, the mapping may also be a function of numerology, such as tone spacing in the system band. Example tone spacing may be 15 kHz, 30 kHz, 60 kHz, 80 kHz, 100 kHz, 120 kHz, 240 kHz, or other suitable spacing.

In yet another embodiment, the non-contiguous RBGs 408 described in FIG. 8 may be implemented in conjunction with the dynamic sizes of RBGs 408 discussed in FIG. 6. For example, a control signal in the control channel 410 may indicate the size of RGB 408. The UE 106 may then select one of the mappings that include the RBG size indicated in the control signal from the tables stored in UE 106.

In an embodiment, the base station 104 may use a radio resource control (RRC) message to configure a set of mappings for RBGs 408 and transmit the mappings to the UE 106. The RRC message may include instructions that UE 106 uses to configure a new set of mappings in the tables stored in UE 106. The base station 104 may then transmit a control signal in the control channel 410 to dynamically select one or more mappings for the RBG 408 set using RRC.

There are multiple embodiments that may be implemented with different aspects of the disclosure. For example, in an aspect of the disclosure, a method for wireless communication includes communicating, by a wireless communication device, a signal in a control channel that indicates a size of a resource block group and allocating one or more resource blocks to the wireless communication device according to the resource block groups allocated to the wireless communication device and the indicated size of the resource block group.

In an additional aspect of the disclosure, an apparatus for wireless communication includes a wireless device comprising a transceiver and a processor, the transceiver configured to communicate a signal in a control channel that indicates a size of a resource block group and the processor configured to allocate one or more resource blocks to the wireless communication device according to the resource block groups allocated to the wireless communication device and the indicated size of the resource block group.

In an additional aspect of the disclosure, embodiments include a computer-readable medium having program code recorded thereon, the program code comprising code for causing a wireless communication by a wireless communication device that comprises communicating a signal in a control channel that indicates a size of a resource block group and allocating one or more resource blocks to the wireless communication device according to the resource block groups allocated to the wireless communication device and the indicated size of the resource block group.

In an additional aspect of the disclosure, embodiments include a wireless communication device comprising means for wirelessly communicating a signal in a control channel that indicates a size of a resource block group and allocating one or more resource blocks to the wireless communication device according to the resource block groups allocated to the wireless communication device and the indicated size of the resource block group.

In an additional aspect of the disclosure, a method for wireless communications includes communicating, by a wireless communication device, a signal in a control channel that indicates an index into a set of allowed values for a number of resource blocks and allocating the plurality of resource blocks to the wireless communication device according to the index. In yet another aspect of the disclosure, the set of allowed values for the number of resource blocks in the method consists of powers of two.

In an additional aspect of the disclosure, an apparatus for wireless communication includes a wireless device comprising a transceiver and a processor, the transceiver configured to communicate a signal in a control channel that indicates an index into a set of allowed values for a number of resource blocks and the processor configured to allocate the plurality of resource blocks to the wireless communication device according to the index. In yet another aspect of the disclosure, the set of allowed values for the number of resource blocks in the apparatus consists of powers of two.

In an additional aspect of the disclosure, embodiments include a computer-readable medium having program code recorded thereon, the program code comprising code for causing a wireless communication by a wireless communication device that comprises communicating a signal in a control channel that indicates an index into a set of allowed values for a number of resource blocks and allocating the plurality of resource blocks to the wireless communication device according to the index. In yet another aspect of the disclosure, the set of allowed values for the number of resource blocks in the computer-readable medium having the program code recorded thereon consists of powers of two.

In an additional aspect of the disclosure, embodiments include a wireless communication device comprising means for wirelessly communicating a signal in a control channel that indicates an index into a set of allowed values for a number of resource blocks and allocating the plurality of resource blocks to the wireless communication device according to the index. In yet another aspect of the disclosure, the set of allowed values for the number of resource blocks in the wireless communication device consists of powers of two.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C). It is also contemplated that the features, components, actions, and/or steps described with respect to one embodiment may be structured in different order than as presented herein and/or combined with the features, components, actions, and/or steps described with respect to other embodiments of the present disclosure.

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

What is claimed is:

1. A method for wireless communications, comprising:
communicating, by a first wireless communication device, a signal in a control channel that indicates a selection of a mapping configuration from a table of different mapping configurations that map at least one resource block to a plurality of different resource block groups and the signal further indicates a size of the resource block group and a size of contiguously allocated resource blocks in the resource block group and the selection of the mapping configuration is further based on the size of the resource block group and the size of the contiguously allocated resource blocks, wherein the at least one resource block carries data to be communicated to a second wireless communication device; and communicating data to the second wireless communication device using the at least one resource block mapped to a particular resource block group of the plurality of resource block groups using the selected mapping configuration.

2. The method of claim 1, wherein the particular resource block group has a different size than that of other resource block groups of the plurality of resource block groups.

3. The method of claim 1, wherein a number of resource blocks in the particular resource block group of the plurality of resource block groups is a power of two.

4. The method of claim 1, wherein a number of resource blocks in the plurality of resource block groups varies with an application that utilizes the data.

5. The method of claim 1, wherein the signal further indicates a selection of the table from a plurality of tables and the mapping configuration in the table that maps a location of the at least one resource block that carries the data.

6. The method of claim 1, wherein the first wireless communication device is a base station and the second wireless device is a user equipment.

7. An apparatus comprising:
a transceiver of a first wireless communication device, the transceiver configured to:
communicate a signal in a control channel that indicates a selection of a mapping configuration from a table of different mapping configurations that map at least one resource block to a plurality of different resource block groups and the signal further indicates a size of the resource block group and a size of contiguously allocated resource blocks in the resource block group and the selection of the mapping configuration is further based on the size of the resource block group and the size of the contiguously allocated resource blocks, wherein the at least one resource block carries data to be communicated to a second wireless communication device; and
communicate the data to the second wireless communication device using the selected mapping configuration that maps the at least one resource block to a particular resource block group of the plurality of resource block groups.

8. The apparatus of claim 7, wherein the particular resource block group has a different size than that of other resource block groups of the plurality of resource block groups.

9. The apparatus of claim 7, wherein a number of resource blocks in the particular resource block group is a power of two.

10. The apparatus of claim 7, wherein a number of resource blocks in the particular resource block group varies with an application that utilizes the data.

11. The apparatus of claim 7, wherein the transceiver communicates the signal that indicates a selection of the table from a plurality of tables stored in the second wireless communication device and indicates the mapping configuration in the table that maps a location of the at least one resource block in the particular resource block group that carries the data.

12. A method for wireless communications, comprising:
communicating, by a wireless communication device to a second wireless device, a plurality of mapping configurations that map a plurality of resource block groups into a plurality of resource blocks in a shared channel, wherein the mapping configurations include different sizes for each resource block group in the plurality of resource block groups and sizes of contiguous resource blocks;

communicating, by the wireless communication device, a signal in a control channel that indicates a size of a resource block group from the plurality of resource block groups and a size of resource blocks, and wherein the signal indicates a selection of a mapping configuration from the plurality of mapping configurations according to the size of the resource block group and the size of the resource blocks;

determining a set of resource blocks from the plurality of resource blocks in the shared channel to be included in the resource block group according to the selected mapping configuration; and communicating data in the set of resource blocks.

13. The method of claim 12, wherein the set of resource blocks included in the resource block group are contiguous or not contiguous.

14. The method of claim 12, further comprising:
communicating a radio resource control (RRC) message, wherein the RRC message includes one or more of the plurality of mapping configurations that are not predefined in a recipient of the RRC message.

15. The method of claim 12, further comprising:
generating the plurality of mapping configurations such that the plurality of resource block groups that correspond to at least one mapping configuration in the plurality of mapping configurations cover a frequency bandwidth used to transmit data.

16. The method of claim 12, wherein the signal indicates a resource block group index; and
the determining further comprises determining the set of resource blocks to be included in the resource block group according to the mapping configuration selected using the resource block group index.

17. The method of claim 12, wherein the signal indicates numerology data; and
the determining further comprises determining the set of resource blocks to be included in the resource block group according to the mapping configuration selected using the numerology data.

18. The method of claim 12, wherein the signal indicates size of the resource block group; and
the determining further comprises determining the set of resource blocks to be included in the resource block group according to the mapping configuration selected using the size of the resource block group.

19. An apparatus for wireless communications, comprising:
a transceiver configured to:
communicate a plurality of mapping configurations for a plurality of resource block groups into a plurality of resource blocks in a shared channel, wherein the mapping configurations include different sizes for each resource block group of the plurality of resource block groups and sizes of resource blocks;
communicate a signal in a control channel that indicates a size of a resource block group from the plurality of resource block groups and a size of the resource blocks, and wherein the signal indicates a selection of a mapping configuration from the plurality of mapping configurations according to the size of the resource block group and the size of the resource blocks; and communicating data using a set of resource blocks from the plurality of resource blocks; and a processor configured to:
selecting a particular resource block group according to the selected mapping configuration;
determine the set of resource blocks in the shared channel to be included in the particular resource block group.

20. The apparatus of claim 19, wherein the set of resource blocks included in the particular resource block group are contiguous or not contiguous.

21. The apparatus of claim 19, wherein the transceiver is further configured to communicate the data using the set of resource blocks that are assigned to a user equipment.

22. The apparatus of claim 19, wherein the signal indicates a resource block group (RBG) index; and
wherein the processor is further configured to determine the set of resource blocks to be included in the particular resource block group according to the mapping configuration selected using the RBG index.

23. The apparatus of claim 19, wherein the signal indicates numerology data; and
wherein the processor is further configured to determine the set of resource blocks to be included in the particular resource block group according to the mapping configuration selected using the numerology data.

* * * * *